US008584130B2

(12) United States Patent
Abbondanzio et al.

(10) Patent No.: US 8,584,130 B2
(45) Date of Patent: Nov. 12, 2013

(54) ALLOCATION OF RESOURCES ON COMPUTER SYSTEMS

(75) Inventors: Antonio Abbondanzio, Raleigh, NC (US); Shamsundar Ashok, Austin, TX (US); NicoleLyne Jones, Cedar Park, TX (US); Dennis D. Jurgensen, Cary, NC (US); Rolf Kocheisen, Pflugerville, TX (US); Yan S. Koyfman, Poughkeepsie, NY (US); Sherry M. Pitz, Raleigh, NC (US); Peter A. Richman, Saugerties, NY (US); Devon D. Snyder, Cary, NC (US); William J. Vanca, Chapel Hill, NC (US); Philip K. Warren, Austin, TX (US); Robert E. Warren, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 2113 days.

(21) Appl. No.: 11/565,599

(22) Filed: Nov. 30, 2006

(65) Prior Publication Data
US 2008/0134173 A1 Jun. 5, 2008

(51) Int. Cl.
*G06F 9/46* (2006.01)
*G06F 9/455* (2006.01)
*G06F 3/00* (2006.01)

(52) U.S. Cl.
USPC .............................. 718/104; 718/1; 715/700

(58) Field of Classification Search
USPC .................. 715/764, 801; 718/1, 104; 709/22
See application file for complete search history.

(56) References Cited

U.S. PATENT DOCUMENTS

| 5,550,970 | A  |   | 8/1996 | Cline et al. |
| 5,553,289 | A  | * | 9/1996 | Johnson et al. ............... 715/705 |
| 5,640,595 | A  | * | 6/1997 | Baugher et al. ................. 710/10 |
| 7,065,637 | B1 | * | 6/2006 | Nanja ............................... 713/1 |
| 7,483,978 | B2 | * | 1/2009 | Esfahany et al. ............. 709/224 |
| 7,486,626 | B1 | * | 2/2009 | Mountcastle ................. 370/254 |

(Continued)

OTHER PUBLICATIONS

Quintero et al., Hardware Management Console (HMC) Case Configuration Study for LPAR Management, Redbooks Paper, 2005, pp. 1-58.

(Continued)

*Primary Examiner* — Jennifer To
(74) *Attorney, Agent, or Firm* — Brandon C. Kennedy; Cynthia G. Seal; Biggers & Ohanian, LLP.

(57) ABSTRACT

A method, computer program product, and system for allocating resources on computer systems are provided. The method, computer program product, and system provide for displaying a resource allocation matrix, the resource allocation matrix including a plurality of cells, each of the plurality of cells indicating a quantity of one of a plurality of resources on one of a plurality of physical systems allocated to one of a plurality of virtual systems hosted by the one physical system, receiving an input changing the quantity indicated in a cell, the cell indicating the quantity of a resource on a physical system allocated to a virtual system hosted by the physical system, and adjusting the quantity of the resource allocated to the virtual system based on the input.

12 Claims, 5 Drawing Sheets

(56) References Cited

U.S. PATENT DOCUMENTS

| | | |
|---|---|---|
| 2002/0087611 A1* | 7/2002 | Tanaka et al. .................. 709/1 |
| 2002/0105548 A1* | 8/2002 | Hayton et al. ................ 345/764 |
| 2003/0033399 A1 | 2/2003 | Garnett et al. |
| 2003/0093501 A1 | 5/2003 | Carlson et al. |
| 2004/0003063 A1 | 1/2004 | Ashok et al. |
| 2004/0021678 A1 | 2/2004 | Ullah et al. |
| 2005/0027812 A1 | 2/2005 | Bozak et al. |
| 2005/0125537 A1 | 6/2005 | Martins et al. |
| 2007/0094367 A1* | 4/2007 | Esfahany et al. ............. 709/223 |
| 2007/0239954 A1* | 10/2007 | Sakashita et al. ............ 711/165 |

OTHER PUBLICATIONS

Harris et al., LPAR Simplication Tools Handbook, IBM Redbooks, Aug. 2006, pp. 1-168, ISBN 0738494763.
Stephen Childs, et al., "A Single-Computer Grid Gateway Using Virtual Machines", Department of Computer Science, Trinity College, Dublin, Ireland.
Adam Beguelin, et al., "Visualization and Debugging in a Heterogeneous Environment".
"Introducing Microsoft Virtual Server 2005: Running Legacy Windows Environments on Dell PowerEdge Servers".

* cited by examiner

ALLOCATION OF RESOURCES ON COMPUTER SYSTEMS

FIELD OF THE INVENTION

The present invention relates generally to computer systems. More particularly, the present invention is directed to allocation of resources on computer systems.

BACKGROUND OF THE INVENTION

Some computer systems have the ability to host several virtual computer systems. When a computer system acts as a host system for multiple virtual systems, resources (e.g., processor, memory, disk space, etc.) of the host system have to be allocated to each virtual system.

Allocation of a resource to a virtual system typically involves assigning a fraction of the resource on the host system to the virtual system. Since assignment of resources needs to be repeated for each virtual system hosted by the host system and for each resource of the host system, the allocation process can be time consuming.

In addition, the host system's resources must be allocated in such a way as to ensure that the sum total of all assigned fractions for a particular resource does not exceed an amount of the particular resource that is available, e.g., the total amount of the particular resource minus any fraction the host system needs to operate. Hence, the allocation process can also be susceptible to errors in data entry, which can lead to misallocation of resources.

Consequently, there is a need to provide a mechanism that allows resources to be allocated in a much more efficient manner and reduce the chances of resource misallocation.

SUMMARY OF THE INVENTION

A method, computer program product, and system for allocating resources on computer systems are provided. The method, computer program product, and system provide for displaying a resource allocation matrix, the resource allocation matrix including a plurality of cells, each of the plurality of cells indicating a quantity of one of a plurality of resources on one of a plurality of physical systems allocated to one of a plurality of virtual systems hosted by the one physical system, receiving an input changing the quantity indicated in a cell, the cell indicating the quantity of a resource on a physical system allocated to a virtual system hosted by the physical system, and adjusting the quantity of the resource allocated to the virtual system based on the input.

DETAILED DESCRIPTION

The present invention relates generally to computer systems and more particularly to allocation of resources on computer systems. The following description is presented to enable one of ordinary skill in the art to make and use the invention and is provided in the context of a patent application and its requirements. The present invention is not intended to be limited to the implementations shown, but is to be accorded the widest scope consistent with the principles and features described herein.

In order to provide a cost-effective solution for complex commercial workloads, such as business intelligence, engineering design, financial analysis, petroleum exploration, digital media, and the like, computer systems are sometimes clustered together to form a single, unified computing resource to handle the complex commercial workloads. Each of the computer systems (i.e., physical systems) in the computing resource can host multiple virtual systems, e.g., multiple operating systems concurrently executing on the computer system.

Figure 1:
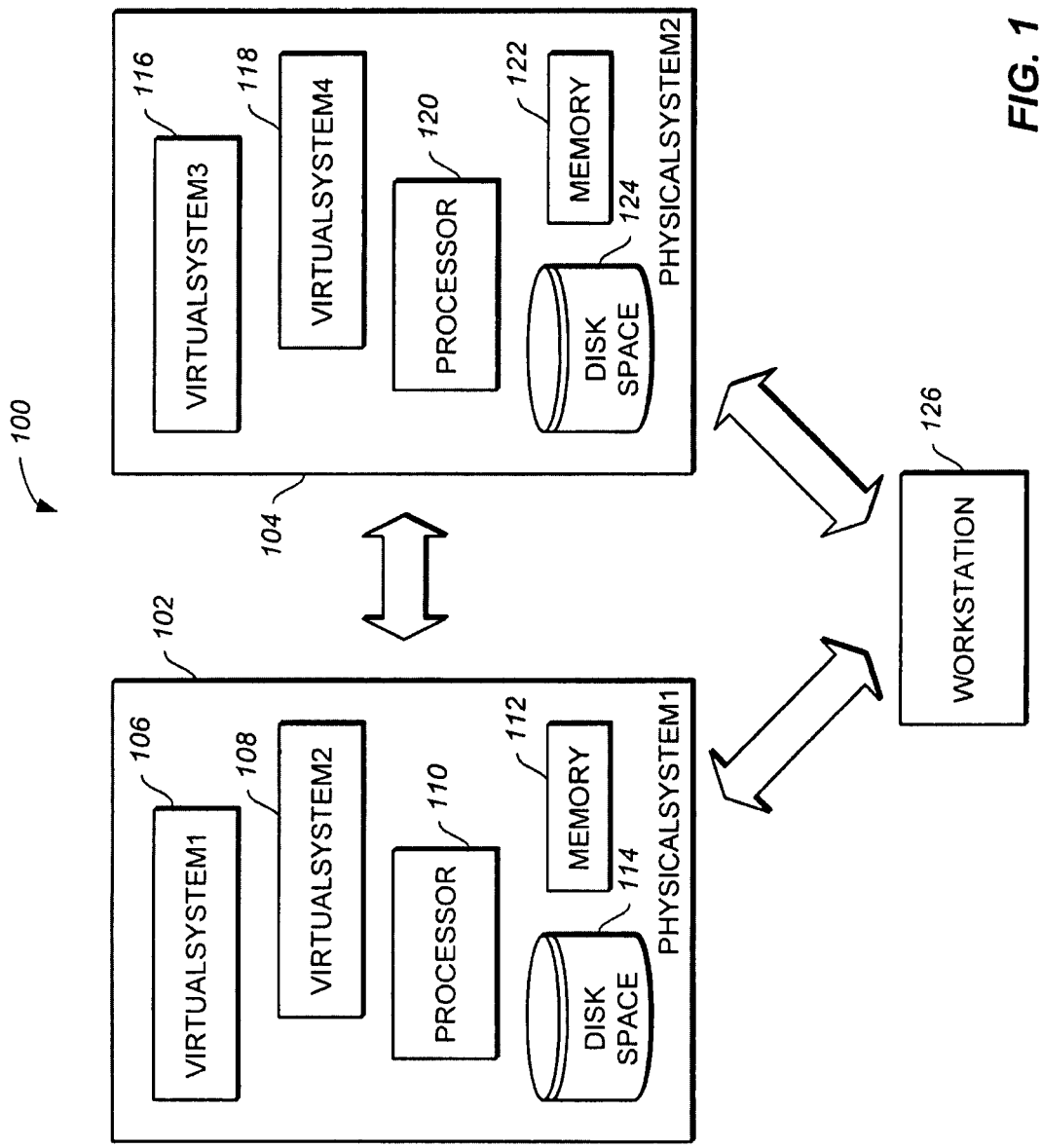
FIG. 1 depicts a system according to an implementation of the invention.

Depicted in FIG. 1 is a system 100 according to an implementation of the invention. Computing resource 100 includes PhysicalSystem1 102 and PhysicalSystem2 104, which are in communication with one another. PhysicalSystem1 102 and PhysicalSystem 2 104 are working together as a single, unified computing resource. In the implementation, PhysicalSystem1 102 is hosting VirtualSystem1 106 and VirtualSystem2 108 and includes a processor 110, a memory 112, and a disk space 114. PhysicalSystem2 104 is hosting VirtualSystem3 116 and VirtualSystem4 118 and includes a processor 120, a memory 122, and a disk space 124.

Each of the physical systems 102-104 can host more or less virtual systems. Although each of the physical systems 102-104 is depicted has having one processor, one block of memory, and one disk space, each processor 110 and 120, memory 112 and 122, and disk space 114 and 124 represents one or more processors, memory blocks, and disk spaces. In addition, other components (not shown) may be included within physical systems 102-104.

When hosting virtual systems, a physical system's resources (e.g., processor, memory, disk space, etc.) need to be allocated to each of the virtual systems. In FIG. 1, a workstation 126, which is in communication with each of the physical systems 102-104, is provided to allow resources 110-114 on PhysicalSystem1 102 to be allocated to VirtualSystem1 106 and VirtualSystem2 108 and resources 120-124 on PhysicalSystem2 to be allocated to VirtualSystem3 116 and VirtualSystem4 118.

Allocation of resources is directed by a user in one implementation. Workstation 126 can be a desktop, laptop, or other data processing system. Additionally, physical systems 102-104 and workstation 126 may be located remotely from one another and communicate with one another via a network (not show), such as a local area network (LAN), a wide area network (WAN), the Internet, etc.

In an environment where there are multiple physical systems hosting multiple virtual systems, such as in FIG. 1, many screens and numerous steps are typically needed to configure a variety of resources on the multiple physical systems for the multiple virtual systems. Such an allocation procedure is time consuming and prone to human error.

Figure 2:
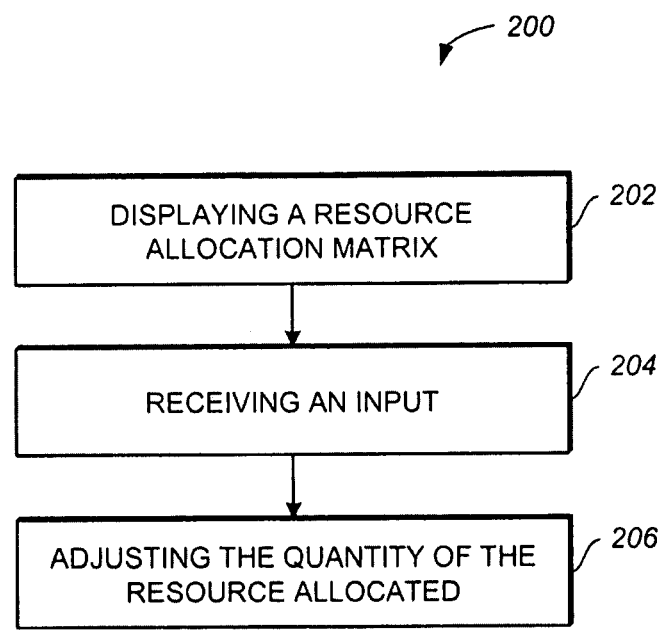
FIG. 2 illustrates a flowchart of a method for allocating resources on computer systems according to an implementation of the invention.

FIG. 2 illustrates a processor 200 for allocating resources on computer systems according to an implementation of the invention. At 202, a resource allocation matrix is displayed. The resource allocation matrix includes a plurality of cells, each of the plurality of cells indicating a quantity of one of a plurality of resources on one of a plurality of physical systems allocated to one of a plurality of virtual systems hosted by the one physical system. The quantity of a resource may be a percentage or a number of units of the resource. In one implementation, at least one of the plurality of resources is processing capacity, memory size, or disk space.

An input changing the quantity indicated in a cell of the resource allocation matrix is received at 204. In one implementation, the input received is input of a value into the cell. In another implementation, the input received is movement of a slider displayed in the cell.

The quantity of the resource allocated to the virtual system is adjusted at 206 based on the input. In one implementation, adjusting the quantity of the resource involves adjusting a percentage of the resource allocated to the virtual system. In another implementation, adjusting the quantity of the resource involved adjusting a number of units of the resource allocated to the virtual system.

By displaying an interactive resource allocation matrix, viewing and modification of the allocation of various resources on multiple physical systems hosting multiple virtual systems occur in one location. Hence, a more efficient allocation process is provided. Additionally, the allocation process is less prone to misallocation of resources because resource allocations for all virtual systems are in one place.

In one implementation, a minimum and a maximum quantity of a resource that can be allocated is displayed in each cell of the resource allocation matrix for reference. In another implementation, adjustment of the quantity of a resource beyond a maximum or a minimum is prohibited. For instance, a slider displayed in a cell can be prevented from going beyond a certain point. As another example, if an inputted value is above a maximum or below a minimum, the value can be automatically revised to be the maximum of minimum.

Figure 3:
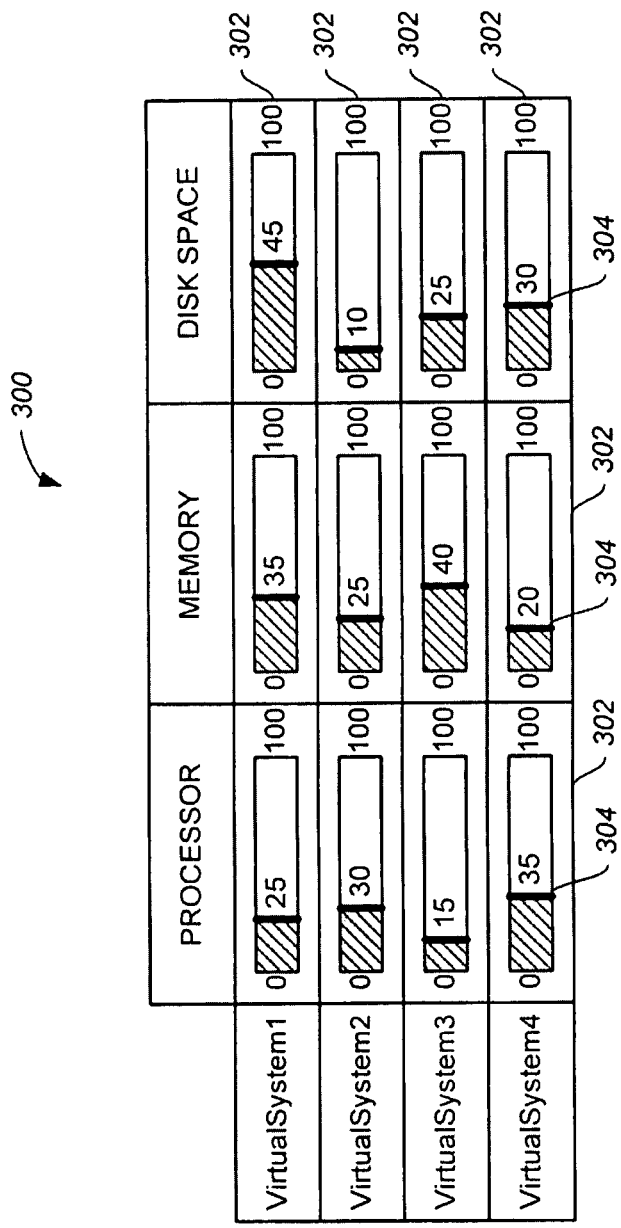
FIGS. 3-4 show resource allocation matrices according to various implementation of the invention.

Shown in FIG. 3 is a resource allocation matrix 300 for virtual systems 106-108 and 116-118 depicted in FIG. 1 according to an implementation of the invention. As shown, each of the virtual systems 106-108 and 116-118 has a row and each of type of resources 110-114 and 120-124 has a column. Resource allocation matrix 300 includes a plurality of cells 302 indicating a quantity of each of the resources 110-114 and 120-124 in physical systems 102-104 allocated to each of the virtual systems 106-108 and 116-118. Each cell 302 also indicates a minimum and a maximum quantity of the resource that can be allocated.

In the implementation, the quantity is a percentage of resources 110-114 and 120-124. The maximum quantity that can be allocated may be 100% of a total amount of resources 110-114 and 120-124 or 100% of an available amount of resources 110-114 and 120-124 (e.g., the total amount minus an amount used by physical systems 102-104). According to resource allocation matrix 300, 25% of an available/total amount of processor 110 is allocated to VirtualSystem1 106 and 30% of the available/total amount of processor 110 is allocated to VirtualSystem2 108, while 15% of an available/total amount of processor 120 is allocated to VirtualSystem3 116 and 35% of the available/total amount of processor 120 is allocated to VirtualSystem4 118.

Each cell 302 in resource allocation matrix 300 also includes a slider 304. In the implementation, resource allocation for a virtual system can be changed by simply moving the corresponding slider 304 to the left or right (e.g., clicking the slider with a mouse and dragging it in one direction or another). Moving to the right increases the allocation, whereas moving to the left decreases the allocation. In another implementation, the slider may be oriented such that moving the slider up increases allocation, while moving the slider down decreases allocation. Alternatively, resource allocation may be changed by inputting a different value into one of the cells 302. For example, the quantity of memory 112 allocated to VirtualSystem2 108 can be changed by selecting the number "25" in the corresponding cell and inputting a different number, e.g. 30.

Although allocation quantities in resource allocation matrix 300 are shown to be whole numbers that are multiples of five, the quantities can be other forms, such as decimals, fractions, etc., and need not be in increments of five. In addition, resource allocation matrix 300 may include additional columns for other resources and additional rows for other virtual systems or other information relating to resources 110-114 and 120-124.

Other information can also be included in a resource allocation matrix to ensure better allocation of resources. For instance, a resource allocation matrix may include additional cells to indicate an unallocated quantity of each resource on each physical system that is available for allocation. As allocation of a resource to a hosted virtual system is adjusted, the unallocated quantity for the resource is also adjusted to reflect the changes. This shows that more or less of a particular resource is available for allocation based on the changes just made.

If the physical systems hosting virtual systems contain inactive resources that may be enabled through purchasing to immediately increase capacity, a resource allocation matrix can also include extra cells to indicate a current quantity of each resource on each physical system that is enabled for allocation and a total quantity of each resource on each physical system that can be enabled. For example, assume a physical system is currently configured to use 68% of its onboard processing capacity. A resource allocation matrix can include an addition cell, similar to cells 302 in FIG. 3, indicating a current quantity of the processor resource enabled in the physical system and a total quantity of the processor resource that can be enabled, if purchased.

More processing capacity can be purchased by, for instance, moving a slider to the right or entering a value in the cell that is higher than the current quantity indicated. Billing information may have to be entered and the purchase may have to be confirmed, for instance, by a user. Once the purchase has been confirmed, if the resource allocation matrix also includes a cell indicating an unallocated quantity of the processor resource on the physical system, then the unallocated quantity is adjusted accordingly. In other words, the unallocated quantity increases proportionally to the purchased quantity.

Resource allocation matrices can include other cells to indicate a portion of the quantity of each resource allocated to each virtual system that is being utilized by the respective virtual system. Each of the cells indicate, for instance, a current and periodically updated utilization percentage of the quantity of a resource currently indicated. The information may be acquired from a resource monitoring functionality included in a virtual system or a resource monitoring application executing on a physical system. Actual utilization can then be compared to allocation and adjustments can be made accordingly. For example, if utilization is too high for a particular resource, allocation for the particular resource can be increased. Conversely, if utilization is low, allocation for the particular resource can be reduced. This assists with optimal resource allocation among virtual systems.

Figure 4:
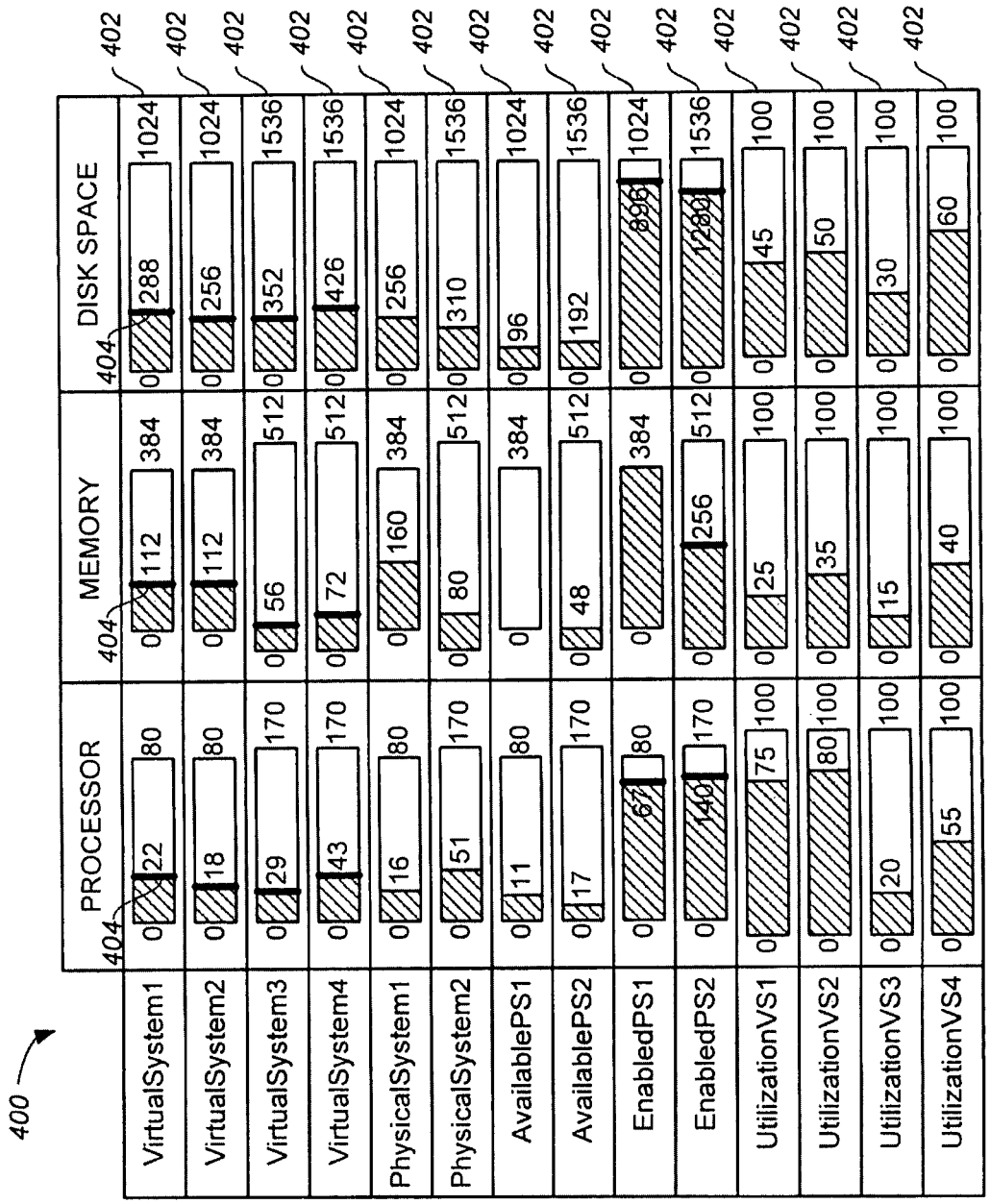

FIG. 4 depicts a resource allocation matrix 400 for virtual systems 106-108 and 116-118 hosted by physical systems 102-104 in FIG. 1 according to an implementation of the invention. Resource allocation matrix 400 includes a plurality of cells 402. A first subset of the cells 402 indicate a quantity of each resource that has been allocated to each virtual systems 106-108 and 116-118. The quantities are in a number of units allocated rather than a percentage as in resource allocation matrix 300 in FIG. 3. Similar to resource allocation matrix 300, the subset of cells 402 indicating current allocation of resources includes a slider 404 to allow allocation to be changed by moving the slider.

Resource allocation matrix 400 also includes a second subset of cells 402 that indicate a quantity of each resource each physical system has reserved for performing its own operations. Additionally, a third subset of cells 402 is included in resource allocation matrix 400 to indicate an unallocated quantity of each resource on each of physical systems 102-104 that is available for allocation. For example, currently there is no memory resource 112 available on PhysicalSystem1 102; all 384 memory units have been allocated— 112 to VirtualSystem1 106, 112 to VirtualSystem2 108, and the remainder to PhysicalSystem1 102.

A fourth subset of cells 402 indicating a current quantity of each resource that is enabled for allocation on each physical system 102-104 and a total quantity of each resource that can be enabled for allocation through, for instance, purchasing, are included in resource allocation matrix 400. In FIG. 4, the total quantity of memory resource 112 that can be enabled in PhysicalSystem1 102 has been enabled. As such, no slider 404 is included in the corresponding cell.

In the implementation, no sliders 404 are included in the second subset of cells 402 because the quantity of each resource reserved by each physical system for its own operations is fixed. Sliders may be included in the second subset of cells 402 in other implementations when modification of the quantity of each resource reserved for each physical system is permitted.

No sliders 404 are included in the third subset of cells 402 either because the unallocated quantity of a resource can only be altered by increasing or decreasing allocation to a virtual system or by enabling an additional quantity of the resource. Resource allocation matrix 400 includes a fifth subset of cells 402 which indicate a portion of the quantity of each resource on each physical system 102-104 allocated to each virtual system hosted by the corresponding physical system that is being utilized by the respective virtual system. In the implementation, the portion is expressed as a percentage of the allocated quantity of a resource being used. The portion may be expressed as a number of units of the resource being used in another implementation. Similar to the third subset of cells 402, the fifth subset of cells 402 do not include sliders 404 because the portion indicated in these cells cannot be directly altered.

The invention can take the form of an entirely hardware implementation, an entirely software implementation, or an implementation containing both hardware and software elements. In one aspect, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk—read-only memory (CD-ROM), and compact disk—read/write (CD-R/W).

Figure 5:
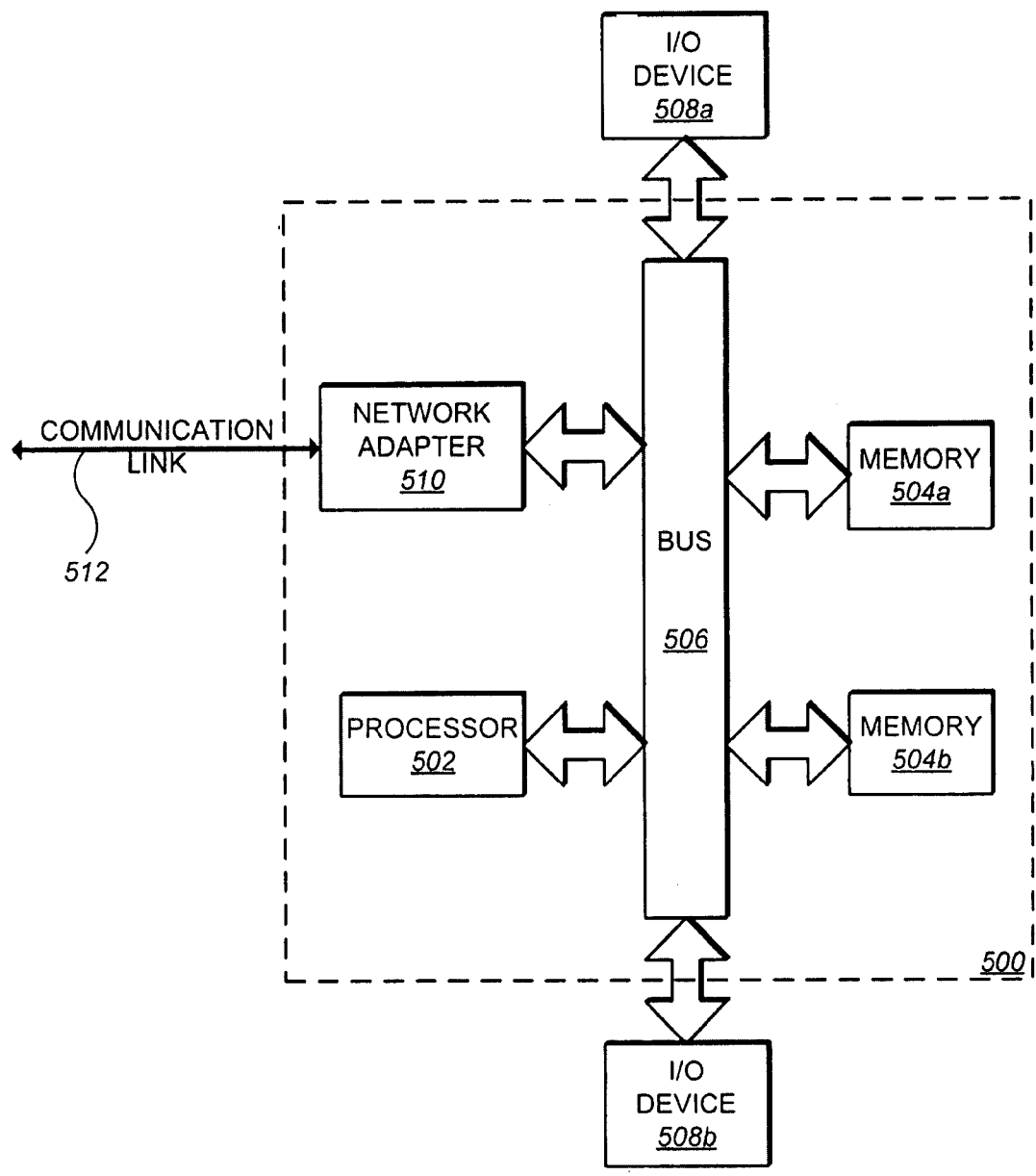
FIG. 5 is a block diagram of a data processing system with which implementations of the invention can be implemented.

Illustrated in FIG. 5 is a data processing system 500 suitable for storing and/or executing program code. Data processing system 500 includes a processor 502 coupled to memory elements 504*a-b* through a system 506. In other implementations, data processing system 500 may include more than one processor and each processor may be coupled directly or indirectly to one or more memory elements through a system bus.

Memory elements 504*a-b* can include local memory employed during actual execution of the program code, bulk storage, and cache memories that provide temporary storage of at least some program code in order to reduce the number of times the code must be retrieved from bulk storage during execution. As shown, input/output or I/O devices 508*a-b* (including, but not limited to, keyboards, displays, pointing devices, etc.) are coupled to data processing system 500. I/O devices 508*a-b* may be coupled to data processing system 500 directly or indirectly through intervening I/O controllers (not shown).

In the implementation, a network adapter 510 is coupled to data processing system 500 to enable data processing system 500 to become coupled to other data processing systems or remote printers or storage devices through communication link 512. Communication link 512 can be a private or public network. Modems, cable modems, and Ethernet cards are just a few of the currently available types of network adapters.

Although the above discussions are in relation to multiple physical systems clustered together as one computing resource, the present invention is equally applicable to a single physical system hosting multiple virtual systems. In addition, when more than one physical system is involved, each physical system can have its own resource allocation matrix for allocation of resources in other implementations.

While various implementations for allocating resources on computer systems have been described, the technical scope of the present invention is not limited thereto. It is to be understood by those skilled in the art that various modifications or improvements can be added to the above implementations. It is apparent from the appended claims that such modified or improved implementations fall within the technical scope of the present invention.

What is claimed is:

1. A method comprising:
   displaying a resource allocation matrix, the resource allocation matrix including a plurality of cells, each of the plurality of cells indicating a quantity of one of a plurality of resources on one of a plurality of physical systems allocated to one of a plurality of virtual systems hosted by the one physical system;
   receiving an input changing the quantity indicated in a cell, the cell indicating the quantity of a resource on a physical system allocated to a virtual system hosted by the physical system; and
   adjusting the quantity of the resource allocated to the virtual system based on the input, wherein the quantity of the resource allocated is adjusted by adjusting a percentage of the resource allocated to the virtual system relative to an amount of the resource available for allocation, wherein the input received is movement of a slider displayed in the cell.

2. The method of claim 1, wherein the input received further includes input of a value into the cell.

3. The method of claim 1, wherein the resource allocation matrix further includes additional cells indicating an unallocated quantity of each of the plurality of resources on each of the plurality of physical systems available for allocation.

4. The method of claim 1, wherein the resource allocation matrix further includes extra cells indicating a current quantity of each of the plurality of resources on each of the plurality of physical systems enabled for allocation.

5. The method of claim 1, wherein the resource allocation matrix further includes other cells indicating a portion of the quantity of each of the plurality of resources on each of the plurality of physical systems allocated to each of the plurality of virtual systems hosted by the corresponding physical system being utilized by the respective virtual system.

6. A computer program product comprising a non-transitory computer readable medium, the computer readable medium including a computer readable program, wherein the computer readable program when executed on a computer causes the computer to:
display a resource allocation matrix, the resource allocation matrix including a plurality of cells, each of the plurality of cells indicating a quantity of one of a plurality of resources on one of a plurality of physical systems allocated to one of a plurality of virtual systems hosted by the one physical system;
receive an input changing the quantity indicated in a cell, the cell indicating the quantity of a resource on a physical system allocated to a virtual system hosted by the physical system; and adjust the quantity of the resource allocated to the virtual system based on the input, wherein the quantity of the resource allocated is adjusted by adjusting a percentage of the resource allocated to the virtual system relative to an amount of the resource available for allocation, wherein the input received is movement of a slider displayed in the cell.

7. The computer program product of claim 6, wherein the input received further includes input of a value into the cell.

8. The computer program product of claim 6, wherein the resource allocation matrix further includes additional cells indicating an unallocated quantity of each of the plurality of resources on each of the plurality of physical systems available for allocation.

9. The computer program product of claim 6, wherein the resource allocation matrix further includes extra cells indicating a current quantity of each of the plurality of resources on each of the plurality of physical systems enabled for allocation.

10. The computer program product of claim 6, wherein the resource allocation matrix further includes other cells indicating a portion of the quantity of each of the plurality of resources on each of the plurality of physical systems allocated to each of the plurality of virtual systems hosted by the corresponding physical system being utilized by the respective virtual system.

11. A system comprising:
a plurality of physical systems in communication with one another, each of the plurality of physical systems including a plurality of resources and hosting a plurality of virtual systems; and
a workstation in communication with each of the plurality of physical systems, the workstation being operable to:
display a resource allocation matrix, the resource allocation matrix including a plurality of cells, each of the plurality of cells indicating a quantity of one of a plurality of resources on one of a plurality of physical systems allocated to one of a plurality of virtual systems hosted by the one physical system,
receive an input changing the quantity indicated in a cell, the cell indicating the quantity of a resource on a physical system allocated to a virtual system hosted by the physical system, and
adjust the quantity of the resource allocated to the virtual system based on the input, wherein the quantity of the resource allocated is adjusted by adjusting a percentage of the resource allocated to the virtual system relative to an amount of the resource available for allocation, wherein the input received is movement of a slider displayed in the cell.

12. The system of claim 11, wherein the resource allocation matrix further includes other cells indicating a portion of the quantity of each of the plurality of resources on each of the plurality of physical systems allocated to each of the plurality of virtual systems hosted by the corresponding physical system being utilized by the respective virtual system.

* * * * *